Feb. 27, 1962 W. R. JOHNSON ETAL 3,023,279

TRANSDUCER MOUNTING

Filed June 4, 1956 2 Sheets-Sheet 1

INVENTORS
WESLEY R. JOHNSON
DALE O. LARSON

BY Cushman, Darby & Cushman
ATTORNEYS

INVENTORS
WESLEY R. JOHNSON
DALE O. LARSON

BY Cushman, Darby & Cushman
ATTORNEYS 3,023,279
TRANSDUCER MOUNTING

Wesley R. Johnson, Minneapolis, and Dale O. Larson, St. Paul, Minn., assignors to Sperry Rand Corporation, New York, N.Y., a corporation of Delaware Filed June 4, 1956, Ser. No. 589,227
18 Claims. (Cl. 179—100.2)

This invention relates to transducing apparatus and means for adjusting and locking same in a predetermined position relative to a recording surface.

For convenience the description of this invention will proceed with reference to the embodiment of its various features into a magnetic drum storage system. However, this invention is not limited thereto, since it is equally usable with magnetizable, light sensitive, and other records in the form of discs, tapes, wires, cards, etc.

Magnetic drum storage systems have been developed to meet the requirements of modern automatic data-handling systems for rapid-access storage of initial data, commands and intermediate and final results of computations. By way of example, U.S. Patent No. 2,708,693 to A. P. Hendrickson, shows a typical magnetic drum equipped with magnetic transducing heads wherein a maximum of 16,384 24-digit binary numbers may be stored as magnetic marks on the surface of a continuously rotating storage drum. The marks stored at a density of 1280 per square inch are arranged in parallel peripheral tracks, with a magnetic head for reading and writing assigned to each track.

Magnetic transducers that record on and read from a rotating record member must be positively secured to the drum shroud, and furthermore, must be capable of being adjusted in a high degree of accuracy, the clearance between the magnet and the drum periphery being of the order of .002 inch. Thus it can be seen that the magnetic heads must be positioned closely adjacent to but out of contact with the rotating drum.

Previous methods of adjusting the spacing between a transducer and the rotating drum have been directed towards providing separate adjusting and locking means for each individual transducer. Each separate head has had an adjusting mechanism integrally attached to it. This feature, namely, a built-in adjusting apparatus for each head, has contributed greatly to the increased cost of manufacture of magnetic drum systems. The need for a magnetic transducer mounting that can be adjusted and locked with removable apparatus has become more acute as the size and capacity of rotating drum storage systems have increased.

Accordingly, it is an object of this invention to provide a transducer mounting that can be adjusted with a separate adjusting tool.

A further object of this invention is to provide a transducer mounting that can be locked securely with a separate locking tool.

It is another object of this invention to provide in a recording system a means of preventing a transducer from contacting the record after adjustment and during operation of the record.

A still further object of this invention is to provide in a recording system a locking device that relies on friction to hold the transducing head in its correct position. Other objects and advantages of the invention will be apparent from the following specification and accompanying drawings, wherein.

Figure 1:
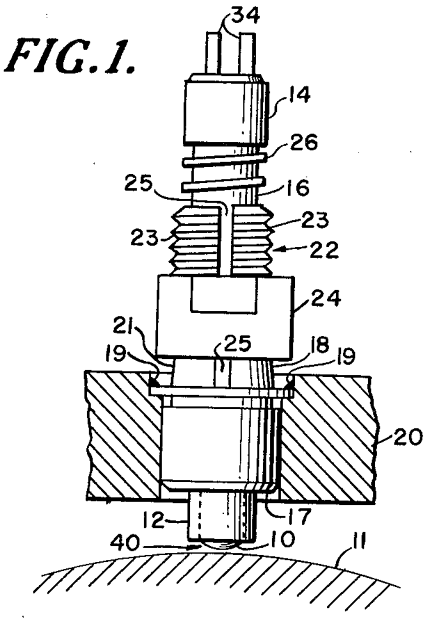
FIGURE 1 is a partial sectional view illustrating a transducer mounted on a drum shroud.
Figure 2:
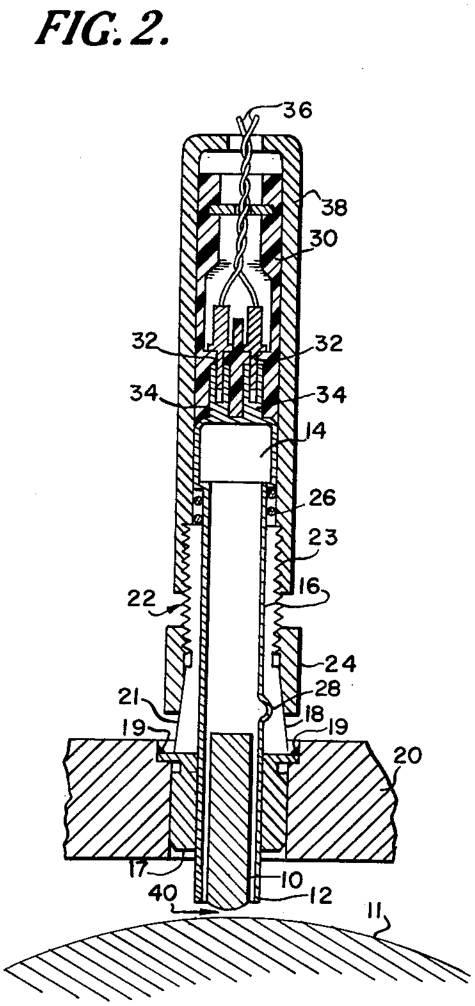
FIGURE 2 illustrates a central longitudinal sectional view of the transducer assembled.

Referring now to the drawings and particularly to FIGURES 1 and 2, there is diagrammatically shown a transducing device 10 partially within a supporting means, such as housing 12, mounted in relation to a record member, such as a magnetic drum 11. The housing is a slender cylindrical body and has an enlarged diameter at its upper or head portion 14. Surrounding the lower or body portion 16 of the housing is a releasable holding or retaining means, such as a four-fingered collet 18, the lower extremity 17 of which has a diameter which is pressed into an opening of a general support means, such as drum shroud 20. The collet is then secured to the drum shroud in any suitable manner as by staking as shown at 19. Along the central portion 21 and the upper portion 22 of the collet are four fingers 23 separated by four vertical slots 25 (only one shown in FIGURE 1). External threads on the upper collet portion 22 receive a collet locking nut 24. When tightened onto the collet fingers, the locking nut slides down over the frusto-conical central portion 21 of the collet and presses the fingers 23 against the body portion 16 of the housing to hold the housing 12 in vertical position by friction. Biasing the upper end of the threaded fingers and the lower end of the head portion 14 away from each other is a spring 26. As will be later explained, this spring keeps the magnetic head 10 away from the rotating drum 11 during the head setting operation by resisting the force applied by the adjusting means.

In order to prevent the magnetic head 10 from rotating, the housing 12 has a pinched-out portion or upset 28 (FIGURE 2) which slidably fits into one of the grooves between the fingers 23 of the collet 18. When fully assembled, the transducing device as shown in FIGURE 2 further includes an insulating insert plug 30 which has contacts 32 that fit into the electrical terminals 34 of FIGURE 1. From the contacts 32 wires 36 lead to suitable detecting apparatus. To protect the upper end of the housing and the connections thereto, a cover 38 is placed thereabout and threadly engages the upper threaded portion of the collet fingers 23. Assuming the proper distance between the magnetic head 10 and the drum 11 is obtained, the transducing apparatus as a whole is ready to operate in the condition illustrated in FIGURE 2. To attain the desired head-to-drum distance or gap 40, several different tools will be described.

Figure 3:
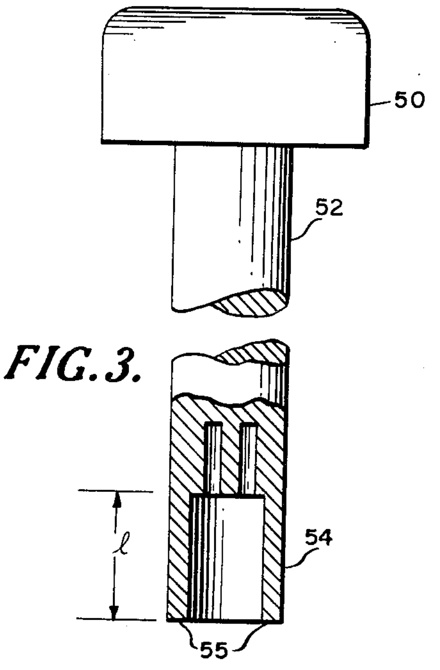
FIGURES 3 and 4 show preliminary gap setting tools which may be used in the initial stages of the transducer adjustment.
Figure 4:
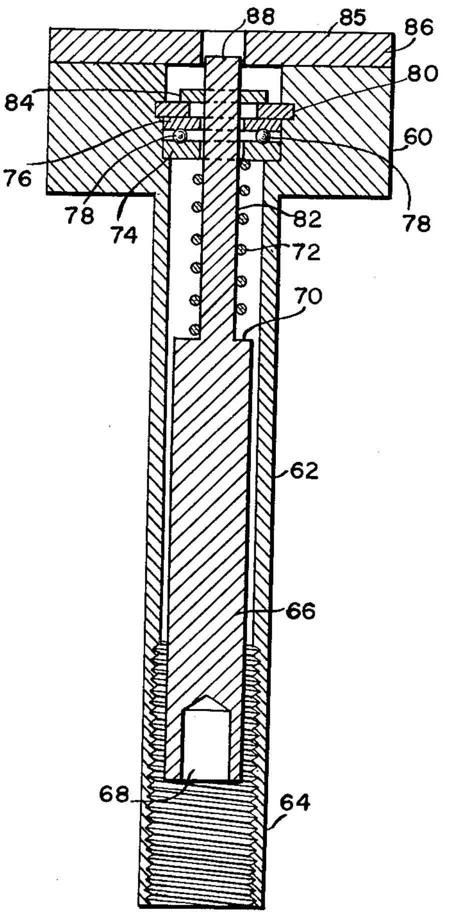

FIGURE 3 illustrates an adjusting tool for initially setting a gap between the head and drum. The tool has a head 50 attached at one end of a shank 52, the other end 54 of which is recessed as by drilling to a predetermined length L to accommodate the head portion 14 and terminals 34. The length L depends on the individual housing head being adjusted, but said length is of such dimension as to allow the end 54 of the tool to slide over head portion 14 and come to rest on the upper ends of the threaded fingers of the collet 18. This assumes the locking nut 24 is suitably released so that the housing may slide within the collet and that sufficient pressure is applied to push the housing downward until the ends 55 are against the upper ends of the threaded fingers 23. It will be apparent that the tool illustrated in FIGURE 3 provides a very quick method of initially setting the gap. However, it is also apparent that deviation from a given overall length of housing 12 will cause only approximate gap settings. Since unduly restrictive and close manufacturing control of the overall housing length greatly increases the unit cost of the housing, a type of initial gap setting tool insensitive to the usual production line variations of housing length is preferred. FIGURE 4 illustrates a tool of this type.

In FIGURE 4 the adjusting tool comprises a head portion 60 integrally formed with a cylindrical shank 62 which is internally threaded at one end 64 to mate the threads on fingers 23 of the collet in FIGURE 1. Inside the cylindrical shank 62 is a plunger 66 suitably recessed at 68 to receive terminals 34 of the housing 12. At the other end of plunger 66 is formed a shoulder 70 for spring 72 to rest against. The other end of spring 72 is pressed against washer 74 which is separated from a similar washer 76 by thrust bearings 78. A retaining ring such as spring or C washer 80 surrounds the plunger stem 82 and suitably recesses into the head portion 60 to secure itself and limit movement of washer 76, etc., toward washer 80. In this manner, head 60 may be rotated without causing plunger 66 to rotate. The plunger stem 82 is the upper portion of the plunger and is preferably integrally formed therewith. To prevent the plunger from falling out of its encasement, a retainer ring 84 is suitably secured to the stem 82. When the covering plate 86 is staked onto the head portion 60, the retainer ring 84 may move only up to the lower edge of the cover plate 86. The upper end 88 of the plunger stem 82 is made flush with the top side 85 of the cover plate when the spring 72 is compressed to a degree such that retaining ring 84 engages the cover plate 86. In this manner, there is provided an indicator, as is more fully explained below, which will show when transducing device 10 is touching drum 11 during adjustment of the transducer away from the drum.

In operation the initial gap setting device of FIGURE 4 may be used with housings of varying length provided the lengths vary within reasonable limits. Generally speaking, heads produced in production line quantities do vary within reasonable limits even though they may not meet the requirements necessary for the initial gap setting tool illustrated in FIGURE 3. To set the gap initially with the tool in FIGURE 4, the cylindrical housing 62 is threaded tightly onto the four-fingered collet 18 so that the plunger 66 tightly engages the upper head portion 14 of the housing and compresses spring 72 making surfaces 88 and 85 flush. With the locking nut released and with continued threading of the tool, the housing 12 may be pushed toward the drum until the magnetic head 10 touches the drum. The threads on the fingers of the collet have a slow pitch, for example forty threads per inch, so that one revolution of the head 60 and housing 62 will back off the magnetic head a small, predetermined amount, .025 inch as per the example. If the magnetic head fails to move upwardly while the tool is being backed off, because of failure of spring 26, or perhaps, because of too great a friction between the collet fingers and the housing 12, or for some other reason, the surfaces 85 and 88 of the tool will no longer be flush since the spring 72 will retain the plunger against head portion 14. Therefore, any recess of surface 88 as compared to surface 85 will indicate error in the initial setting of the housing 12. This indicator, therefore, affords a safeguard against the possibility of starting the drum 11 while the magnetic head 10 is touching it. This reduces the possibility of damaging the drum due to faulty or malfunctioning head setting equipment.

Figure 5:
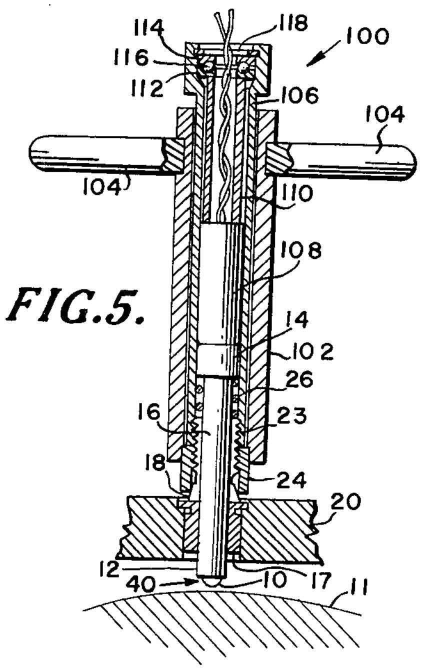
FIGURE 5 shows a sectional view of a magnetic transducer and components for its final adjustment.

After the gap has been initially set by either the tools in FIGURE 3 or 4 or by other desirable means, it is preferable that the final adjustment of the gap distance be made electronically. A typical electronic head setting method is described and claimed in Patent No. 2,708,693 issued to A. P. Hendrickson. To assist in making the final electronic adjustment, the present invention provides an adjusting tool of the type illustrated in FIGURE 5. Cooperating with the adjusting tool 100 is a torque wrench 102 having handles 104. This wrench suitably engages the locking nut 24 for loosening and tightening same on the collet fingers. With the locking nut suitably released, a vertical adjustment of housing 12 within the collet 18 may be made. The adjusting tool 100 is constructed similar to the initial gap setting tool of FIGURE 4. The outer cylindrical housing 106 is internally threaded to engage the threaded portion of the fingers 23. Inside the cylindrical housing 106 is an insulating insert plug 108 similar to the insert plug 30 illustrated in FIGURE 2. Insert 108 has contacts (not shown) which fit over the terminals 34 and connect the magnetic head electrically to electronic equipment used in setting the gap distance. Pressing against the insert 108 is a tubular connector 110 which suitably fits within housing 106 preferably in a frictionless manner. The upper end of connector 110 rests against a washer 112 separated from a similar washer 114 by thrust bearings 116. The washer 114 is held in position by a suitable ring such as C washer 118. Because of the thrust bearings 116, the cylindrical housing 106 may be rotated without causing rotation of the tubular connector 110 or the insulating insert plug 108. In this manner, the housing 12 may be adjusted toward or away from the drum 11 since the spring 26 will act to bias the housing 12 upwardly. While the adjustments are being made, it is apparent that spring 26 also prevents mechanical backlash and assures lateral stability. In addition spring 26 keeps the longitudinal housing axis perpendicular to the drum surface during the adjustment. When a desired adjustment is attained, the torque wrench 102 may be used to lock the housing in position.

Figure 6:
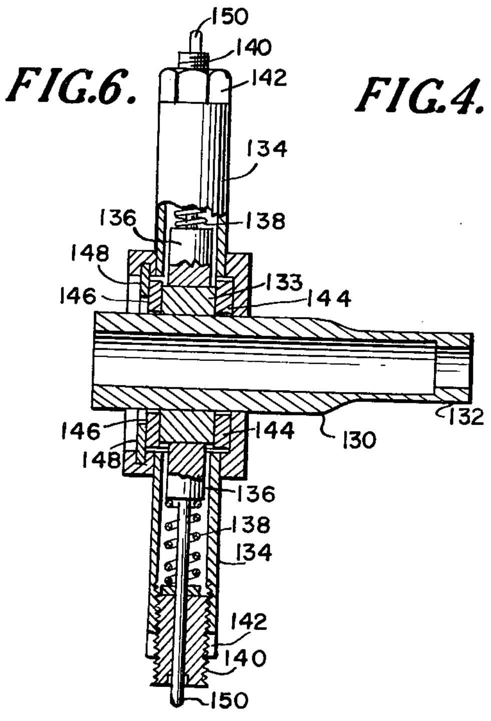
FIGURE 6 illustrates a torque wrench for locking the transducer in place.

Since the adjustment tool 100 and the torque wrench 102 are easily removable from the transducing apparatus, these tools may be readily used to adjust a plurality of transducers. To prevent having to go back over each of the locking nuts with a separate torque wrench after their initial setting is made, a torque wrench which incorporates a torque measuring device may be used in conjunction with the adjusting apparatus. FIGURE 6 illustrates a device of this type and in particular illustrates a "slip" torque wrench by which only a predetermined amount of torque may be applied to the locking of lock nut 24. As in FIGURE 5, the wrench includes a tubular shaft 130 one end 132 of which mates with locking nut 24. Around the other end of tubular shaft 130 is a ring 133 suitably staked to the shaft. Each handle 134 of the wrench includes a friction pad 136 adjustably biased against ring 133 by spring 138 and set screw 140 operative in jam nuts 142. Suitable bearing surfaces 144 are placed between the handle on one side of the retaining ring 133 while similar bearing surfaces 146 are held against the other side of ring 133 by a retaining ring 148. Bearings 144 and 146 provide some friction between the handle and the shaft 130, but operate mainly as "free" spacers, the main torque being applied by friction between the pads 136 and the ring 133. When this wrench is used to tighten a locking nut, the nut may be tightened only a predetermined amount since excessive torque on the handles of the wrench will not be transmitted to the nut because of the "slippage" between ring 133 and friction pads 136 after the friction determined by the set screws and springs is exceeded. In order to use a wrench of this type in loosening locking nuts on the transducer assembly, it may be necessary to add additional torque to overcome the initial starting friction between threads of the locking nut and the fingers 23. To accomplish this, a rod 150 may be inserted through one or both of the set screws 140 and the springs 138 to rest securely on friction pads 136. With slight pressure on the rods, the friction exerted between the ring 133 and friction pads 136 becomes greater and sufficient to overcome the initial starting friction or any sticking that may be present.

Thus it is apparent that there are provided by this invention structures in which the various phases, objects and advantages herein set forth are successfully achieved.

Modifications of this invention not described herein will become apparent to those skilled in the art. Therefore, it is intended that the matter contained in the foregoing description and the accompanying drawings be interpreted as illustrative and not limitative, the scope of the invention being defined in the appended claims.

What is claimed is:

1. Apparatus for mounting a transducer device in predetermined relationship with a record member, comprising main support means disposed at a given distance from said record member, a transducer support member for said transducing device, and releasable locking means for retaining said transducer support member locked at an adjustable substantially perpendicular distance from said record member solely by friction until the locking means releases said transducer support member to allow adjustment of said distance, said last mentioned means being secured to said main support means.

2. Apparatus as in claim 1 wherein the releasable retaining means includes a collet mounted between said transducer support member and support means.

3. Apparatus as in claim 1 wherein the transducer support member includes means cooperable with the retaining means for preventing rotational movement therebetween.

4. Apparatus as in claim 1 and further including means between said transducer support member and the retaining means for exerting bias therebetween tending to move said member in a direction substantially normal to and away from said record member.

5. Apparatus as in claim 1 and further including means for adjusting the distance between said record member and the transducing device.

6. Apparatus as in claim 5 wherein said transducer support member has a head portion and the means for adjusting said distance includes means engageable with said head portion and capable of exerting pressure thereon.

7. Apparatus as in claim 6 wherein the means engageable with said head portion is recessed at one end a given length for sliding over the head portion and engaging said retaining means for at least approximating said predetermined relationship.

8. Apparatus as in claim 5 wherein the transducer support member has a head portion and the releasable retaining means has a threaded portion, the adjusting means including first means threadedly engageable with said threaded portion, second means engageable with said head portion, and means coupling said first and second means for causing relative movement between said transducer support member and the retaining means when said second means tightly engages the head portion and the retaining means allows said movement.

9. Apparatus as in claim 8 and further including first biasing means between said head portion of the transducer support member and the retaining means for urging the support member away from said record member, and wherein the coupling means includes second biasing means for urging said second means toward the record member when the first means engages said threaded portion, and wherein the first and second adjusting means include means for indicating when said distance is substantially zero during adjustment of the transducing device away from the record member, said second adjusting means bearing a given relationship to said first means when the second biasing means is biased a predetermined amount.

10. Apparatus as in claim 5 and further including biasing means between said transducer support member and the retaining means for urging the support member away from said record member and wherein the adjusting means includes means for indicating when said distance is substantially zero during adjustment of the transducing device away from the record member.

11. Apparatus as in claim 5 wherein said support member includes a body portion and a head portion, the retaining means includes a collect lockable to said body portion, and the adjusting means is engageable with said collect and the head portion of said support member to cause relative movement therebetween when said collet is unlocked.

12. Apparatus as in claim 5 wherein the releasable retaining means includes a collet having a locking nut thereon, and wherein said apparatus further includes a torque wrench cooperable with said locking nut for locking said collet to the transducer support member.

13. Apparatus for adjustably mounting a transducing device in a predetermined relationship with a relatively movable record member comprising main support means disposed at a given distance from said record, a transducer support member for said transducing device, means for releasably retaining said transducer support member, said last mentioned means being secured to said main support means and including a threaded portion and means engaging said threaded portion for locking the transducer support member in place when threaded tightly thereon, said transducer support member having a head portion and being biased in relation to the retaining means, adjusting means for regulating the distance between the transducing device and the record member including first means engageable with said threaded portion, second means engageable with said head portion, and means coupling said first and second means for causing cooperation therebetween in a manner such that the first means when threaded onto said retaining means causes the second means to move against said head portion, and torque applying means disposed about said adjusting means for engaging the locking means to cause said transducer support member to retain the position attained by said adjusting means.

14. Apparatus as in claim 13 wherein the releasable retaining means includes a fingered collet, said threaded portion being disposed on the collet fingers, wherein the threaded portion engaging means is a locking nut, wherein the transducer support member is a housing having a body portion around which said collet is disposed and a head portion of dimension larger than the body portion but not greater than a like dimension of the threaded portion of the collet, wherein spring bias means surrounds the body portion between the head portion and the fingers of said collet for urging the head portion and collet apart, and wherein the first and second means of the adjusting means are telescopic, the first fitting over said spring bias means and the head portion of the transducer support member to engage the threaded collet fingers while the second is disposed within the first to press on said head portion when the first is threaded to the collet fingers, the torque applying means being slidable on said first means and engageable with said locking nut for threading thereof.

15. Apparatus as in claim 14 wherein said torque applying means comprises means engageable with said locking nut and friction means biased a given amount against the first mentioned means, the arrangement being such that only a predetermined torque is obtained by movement of the friction means around the locking nut engaging means.

16. Apparatus for setting a predetermined distance between a transducing device and a record member where said transducing device is supported by a first support member, a second support member is disposed at a given distance from said record member, retaining means are secured to said second support member and releasably secured to the first support member so that the first support member when released from the retaining means may move relative thereto; the apparatus including adjusting means completely separable from said retaining means, said first and second support members, and said transducing device, and comprising first means threadedly engageable with said retaining means, second means engageable with said first support member, and means coupling said first and second means for causing relative movement between said first support member and the retaining means when said second means tightly engages the first support member and the retaining means allows said movement.

17. Adjusting means as in claim 16 wherein the coupling means includes biasing means for urging said second means toward the record member when the first means threadedly engages the retaining means, and wherein the first and second means include means for indicating when the distance between the transducing device and record member is substantially zero during adjustment of the transducing device away from the record member, said second adjusting means bearing a given relationship to said first means when the biasing means is biased a predetermined amount.

18. Adjusting means as in claim 17 wherein each of said first and second means has a surface which surfaces are flush only when the biasing means is biased said predetermined amount.

References Cited in the file of this patent

UNITED STATES PATENTS

| | | |
|---|---|---|
| 2,708,693 | Hendrickson | May 17, 1955 |
| 2,721,743 | Erickson et al. | Oct. 25, 1955 |
| 2,742,803 | Simpkin | Apr. 24, 1956 |
| 2,802,905 | Taris | Aug. 13, 1957 |
| 2,814,221 | Preslan | Nov. 26, 1957 |
| 2,864,892 | Perkins | Dec. 16, 1958 |
| 2,900,625 | Jones et al. | Aug. 18, 1959 |
| 2,910,544 | McNutt | Oct. 27, 1959 |

FOREIGN PATENTS

| | | |
|---|---|---|
| 204,862 | Australia | June 16, 1955 |